Jan. 24, 1950  E. L. WALTON  2,495,558
ANGLE AND DISTANCE MEASURING DEVICE
Filed Jan. 17, 1947  2 Sheets-Sheet 1
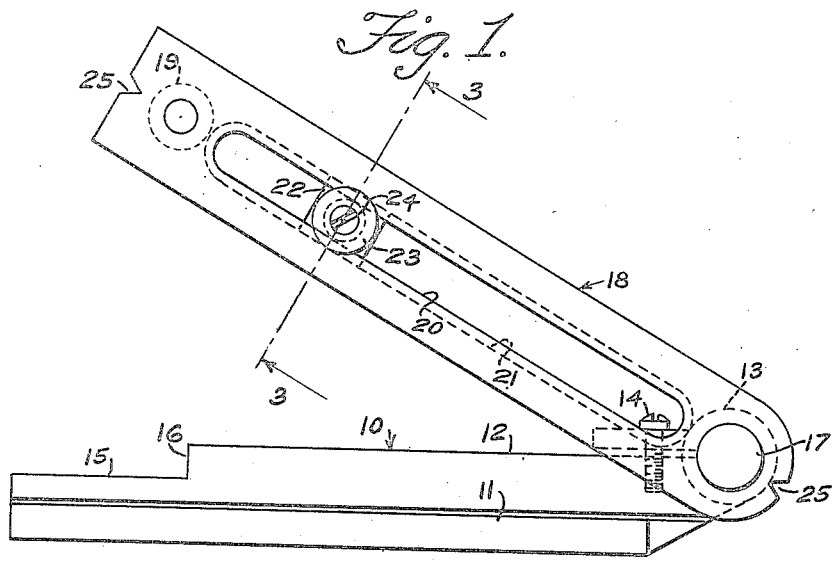
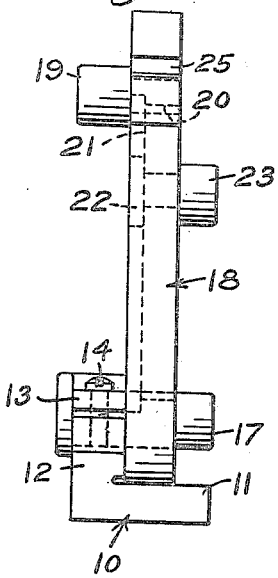
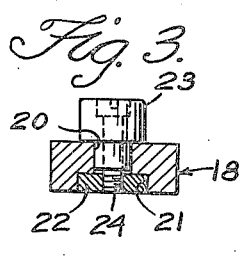
INVENTOR.
Edward L. Walton,
BY Victor J. Evans & Co.
ATTORNEYS Jan. 24, 1950 E. L. WALTON 2,495,558
ANGLE AND DISTANCE MEASURING DEVICE
Filed Jan. 17, 1947 2 Sheets-Sheet 2

INVENTOR.
Edward L. Walton
BY Victor J. Evans & Co.
ATTORNEYS

Patented Jan. 24, 1950

2,495,558

UNITED STATES PATENT OFFICE 2,495,558

ANGLE AND DISTANCE MEASURING DEVICE

Edward L. Walton, Milwaukee, Wis., assignor to W-W Tool Company, Milwaukee, Wis., a corporation of Wisconsin Application January 17, 1947, Serial No. 722,485

2 Claims. (Cl. 33—75)

This invention relates to an angle tool for setting the compounds on a lathe to the right angle.

The tool is also adapted for use with other machines, can be used as a layout tool and can also be used to check figures of angular formation.

An object of the invention, therefore, is to provide a tool that may be used by machinists for measuring or laying out angles and bevels or for measuring lengths, thickness or diameters of various objects.

With the above and other objects and advantages in view, the invention consists of the novel details of construction, arrangement and combination of parts more fully hereinafter described, claimed and illustrated in the accompanying drawing in which:

Figure 1 is a side elevation of an embodiment of the invention;

Figure 2 is an end view thereof;

Figure 3 is a sectional view on the line 3—3 of Figure 1;

Figure 4:
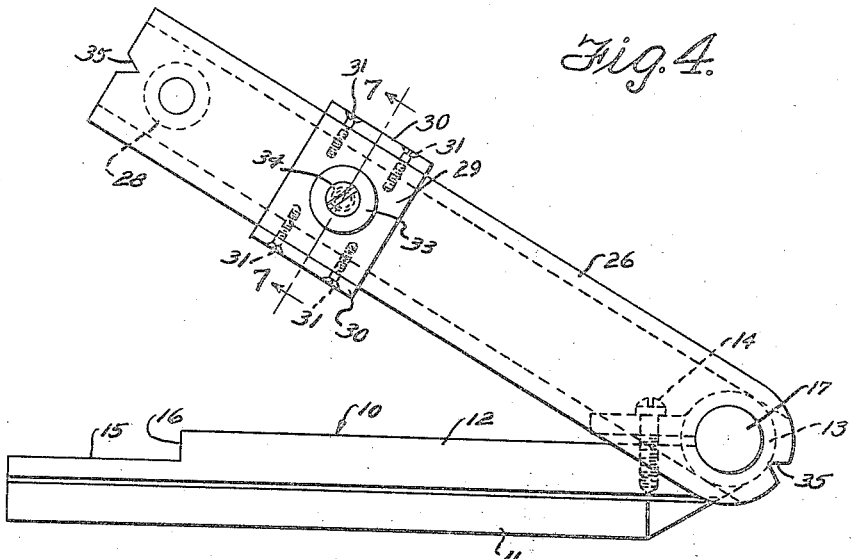
Figure 4 is a side elevation of a modified form of the invention.

Referring more in detail to the drawing, the reference numeral 10 designates the base section having the platform 11 and the upstanding right angularly disposed flange 12 which is provided at its rear end with a split bearing 13 which is compressed in diameter by means of the screw 14 engaging the split portions thereof. At the opposite end of the flange, a longitudinal cutout 15 terminates in the vertical shoulder 16. The height of the cutout from the lower surface of the platform 11 is .500 while the height of the flange from the lower surface of the platform 11 is .750 and these measurements can be used in determining the size of various figures.

Receivable in the bearing 13 is a headed pin 17 which, except for the head, is of the same length as the thickness of the platform 11 and the pin head is .500 in diameter.

Mounted for pivotal movement on the pin 17 is the arm 18 which is provided at the opposite end with a small knob 19 which is also .500 in diameter, and the distance from the center of pin 17 to the center of knob 19 is 5.000 but it can be varied up to 10.000.

Extending longitudinally of the arm 18 for a large portion thereof is the slot 20 which is countersunk at 21 to receive the block 22 on which the knob 23 is mounted, by means of a screw 24, and the block can be moved in the countersink upon loosening of the screw, and retained in fixed relation thereto by tightening of the screw. The slot is .312 wide, and the countersink is .500, with the knob 23 of the same diameter so that the peripheries of the pin 17 and knob 23 form a straight line longitudinally of the arm.

V notches 25 at each end of the arm are formed at the exact center thereof, so that from either side to the apex of the notch is .500, thus the arm is 1.00 in width.

In use with the tool shown as in Figure 1, the knob 23 can be set at a predetermined distance from the center of knob 17, and the respective distances between corresponding points on pin 19 and knob 23 and the lower surface of the platform 11 be determined. The difference between these measurements divided by the distance between the aforementioned corresponding points on 19 and 23 would give the sin of the angle of arm 18 and hence the angle of an object. The diameter of an object would be determined by measuring the distance between a point on 19 or 23, contacting the object, and the lower surface of platform 11.

From the lower periphery of knob 19 to the cutout 15 would give a difference in diameter of .500. Thus variances in the diameter of the object may be determined.

Figure 5:
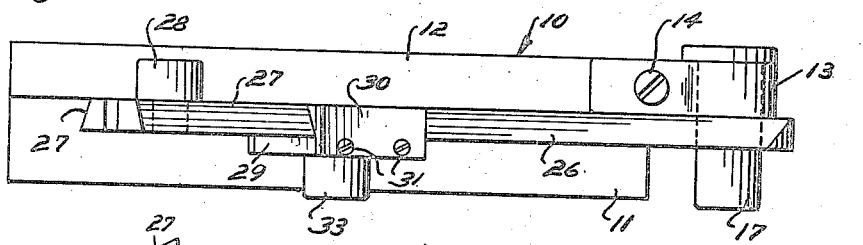
Figure 5 is a top plan view thereof.
Figure 6:
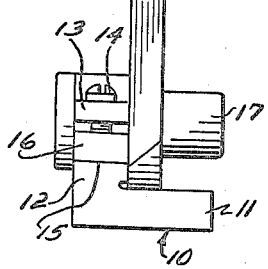
Figure 6 is an end view thereof.
Figure 7:
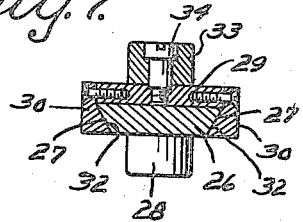
Figure 7 is a sectional view on the line 7—7 of Figure 4.

In Figures 4 to 7 inclusive, the base 10 and its component parts are as previously described. In this instance, however, the arm 26 mounted for pivotal movement on the pin 17, is provided with inwardly bevelled longitudinal edges 27 for a purpose to be later described. This arm, like arm 18, is provided at its free end with a knob 28 which is also .500 in diameter, and the distance from the center of pin 17 to the center of knob 28 is 5.000, but it can be varied up to 10.000.

Mounted for sliding movement on the arm 26 is the plate 29, and such movement is accomplished by the means of side bars 30 secured to the sides of the plate 29 by fasteners 31, and the bars have bevelled inner edges 32 which conform to the bevelled edges 27 of the arm 26. Thus the plate is retained on the arm in sliding engagement therewith. A knob 33 is mounted on the plate 29 by means of a screw 34 and the plate 29 can be moved on the arm 26 by the knob 33 and retained in fixed relation on the arm 26 when the screw 34 is tightened. The knob 33 is of the same diameter as the peripheries of the pin 17, and the knob 28, so that the peripheries of all these form a straight line longitudinally of the arm, as previously described.

V notches 35 at each end of the arm are formed at the exact center thereof, so that from either side to the apex of the notch is .500; thus the arm is 1.00 in width.

This form of the tool operates as previously described; the only difference arising in the manner in which the plate 29 is mounted.

The tool may also be applied to various angles and then measured to determine the angle, and there are other uses to which the tool can be applied that will be apparent to those skilled in the art.

It is to be understood that various changes may be made in the construction of the device, and the device may be used for other purposes than those described, without departing from the spirit of the invention and the scope of the appended claims.

Having described the invention, what is claimed as new and desired to be secured by Letters Patent is:

1. A device of the character described, comprising a base section formed of a platform and a right angled upwardly extending flange, a split bearing on said flange at one end of said base, a pin rotatably mounted in said bearing, means on said bearing for locking the pin against rotation, an arm on said pin whereby said base and said arm may be angularly moved with respect to each other to different positions of adjustment between said base and said arm, said arm having a longitudinally extending slot extending for a large portion thereof, said arm having a countersink surrounding said slot, a block slidably received in said countersink, a knob threadedly secured to said block for locking the same to said arm and extending from one side thereof, and a knob fixed to the opposite end of said arm from said pin and extending from said arm in the opposite direction to said last named knob.

2. The invention as in claim 1 wherein notches are provided at each end of said arm at the center thereof.

EDWARD L. WALTON.

REFERENCES CITED

The following references are of record in the file of this patent:

UNITED STATES PATENTS

| Number | Name | Date |
| --- | --- | --- |
| 510,139 | Houck et al. | Dec. 5, 1893 |
| 539,492 | Stone | May 21, 1895 |
| 672,213 | Holcomb | Apr. 16, 1901 |
| 1,303,633 | Bryant | May 13, 1919 |
| 1,382,717 | Duplessie | June 28, 1921 |
| 1,534,865 | Owens | Apr. 21, 1925 |
| 1,581,225 | Parkhill | Apr. 20, 1926 |
| 2,269,814 | Gibson | Jan. 13, 1942 |